United States Patent [19]
Sorli et al.

[11] 3,754,825
[45] Aug. 28, 1973

[54] PHOTOGRAPHIC COPY SYSTEM

[75] Inventors: Dundan C. Sorli, Chelmsford; Charles M. Ventre, Saugus, both of Mass.

[73] Assignee: Polaroid Corporation, Cambridge, Mass.

[22] Filed: Apr. 26, 1971

[21] Appl. No.: 137,486

[52] U.S. Cl. .................... 355/70, 355/69, 355/113
[51] Int. Cl. ........................................ G03b 27/54
[58] Field of Search .................... 355/70, 114, 115, 355/117, 118, 113; 355/67, 69; 350/288

[56] References Cited
UNITED STATES PATENTS

| | | | |
|---|---|---|---|
| 3,465,656 | 9/1969 | Wick | 95/10 R |
| 3,645,620 | 2/1972 | Jaffe | 355/69 |
| 3,522,991 | 8/1970 | Bowen | 355/83 |
| 1,878,702 | 9/1932 | Hopkins | 355/115 |
| 1,385,162 | 7/1921 | Tillyer | 352/148 |
| 1,212,022 | 1/1917 | Croston | 355/113 |
| 2,692,529 | 10/1954 | Halahan | 352/129 X |
| 3,119,301 | 1/1964 | Beattie | 355/70 X |
| 1,535,041 | 4/1925 | Ruhmann | 355/70 X |
| 2,729,155 | 1/1956 | Fix | 355/114 |

*Primary Examiner*—Samuel S. Matthews
*Assistant Examiner*—Monroe H. Hayes
*Attorney*—Brown & Mikulka

[57] ABSTRACT

A photographic copy system including a portable light source accessory unit having a plurality of light producing elements. The unit includes a translucent window configured to support an object such as a film transparency in the illumination path in an area in registration with the camera and in an area out of the registration therewith for editing or other ancillary purposes. A flash bulb mounted within the lighting unit directly beneath the translucent window provides illumination of the object for photographic copying purposes and a pair of projector type lamps disposed along side the flash bulb and separated from the translucent window by a dichroic element are utilized primarily for editing and composing purposes, and include separate control elements configured for continuous operation of one lamp and supplemental intermittent operation of the other for viewing of relatively dense transparencies. Additionally, the light source unit includes a reflector accessory for surface lighting of the object, and a control system capable of varying the flash intensity over a prescribed range and for indicating when the proper charge level is achieved. The system also includes supplemental lighting elements for surface illumination of an object when the latter is properly positioned on the lighting unit.

32 Claims, 12 Drawing Figures

Patented Aug. 28, 1973

INVENTORS
DUNCAN C. SORLI
and
CHARLES M. VENTRE

BY Brown and Mikulka
ATTORNEYS

Patented Aug. 28, 1973

INVENTORS
DUNCAN C. SORLI
and
CHARLES M. VENTRE

BY

*Brown and Mikulka*
ATTORNEYS

INVENTORS
DUNCAN C. SORLI
and
CHARLES M. VENTRE

BY Brown and Mikulka
ATTORNEYS

Patented Aug. 28, 1973

INVENTORS
DUNCAN C. SORLI
and
CHARLES M. VENTRE

BY

*Brown and Mikulka*
ATTORNEYS

PHOTOGRAPHIC COPY SYSTEM

This invention relates to photographic copier systems, and has particular reference to lighting for such systems.

One form of a photographic copier system provides an upright support for a downwardly facing camera. The subject to be photographed is placed on a platform beneath the camera, and suitable lighting equipment is provided, to illuminate the platform and the subject thereon from the sides and above the platform.

Such systems are primarily for use in photographing opaque objects or pictures. One such system is presently marketed by Polaroid Corporation of Cambridge, Massachusetts as the MP-3 Multipurpose Land Camera.

This invention provides such systems with increased versatility and usefulness by means of a unique lighting unit as an accessory thereto and particularly as a means of establishing photographic capabilities with a variety of operating options as to lighting and variations thereof.

Many needs of operational variety become apparent, and many potentials for versitility are felt, in the usages of photographic copying.

This invention as a lighting accessory for use in combination with a photographic copier, answers many of these needs, shows the way to many such potentials, establishes a climate conductive to creative operational function combinations and usage of photographic capabilities.

Use of the versatile light source accessory combination of this invention makes possible new and innovative photographing of various subject objects. With this device, photographic capability is readily available for film transparencies and small opaque objects or objects with significant thickness and partial opacity. Thus, photographs may be made of elements buried in plastic bodies were effective illumination may be applied to such elements from above. Accordingly, surfaces, depths, solids, and transparencies are all made subject to effective photographing through the use of a photographic copier in combination with a light source accessory according to this invention.

The photographic versatility made possible by this invention involves lighting combinations as related to associated camera function variables. It provides for photographing any of several different sizes of transparencies and prints, and facilitates cropping of such elements, to pinpoint, isolate, and enlarge specific areas thereof. It further provides various viewing facilities through a camera viewer and directly including editing facilities for comparisons, for example, in the course of producing matching photographs.

The structure of the lighting accessory of this invention essentially involves a unit housing which may be placed on a copier platform beneath a copier camera, and which may be freely moved about on this platform to achieve the best position for best or particularly desired effects. For film transparencies, for example, locating means is provided so that a reference point can be repeatably provided as between the transparencies and the lighting unit, to aid in obtaining known positional relations between the transparencies and the camera, as the lighting unit is located or moved about on the copier platform.

For various usage combinations according to this invention, three different light sources are provided. One is a light bulb for simple continuous illumination, for viewing and photographing black and white film transparencies for example. A second light bulb is provided to supplement, on a temporary basis, the illumination from the first light bulb. This aids in viewing color transparencies for example, or in bringing extra illumination to darker elements. The third light source is a flash unit for photographing color transparencies or other elements needing this form and intensity of light.

Such flash units require condensers which are discharged to operate the flash units. In this invention, suitable circuitry and adjustment control is provided to make possible the establishment of different charge values in the condenser. These values may be incremented in step-by-step fashion. For example, five adjustment steps may be provided, each doubling the effect of the previous step. A suitable ready light system is provided to announce the achievement in the condenser of the charge value as called for at the particular adjustment step. For example, if the adjustment is set at the third adjustment step, the ready light is activated when the condenser charge reaches the level of that step. If the adjustment step is changed before the condenser is discharged, the ready light will be extinguished, and it will again light up when the condenser achieves the new change level. This situation follows in both situations of increase or decrease of such condenser charge change before discharge.

The lighting accessory unit of this invention is structured and designed for photographing film transparencies and the like. It is further provided with a reflector accessory, which is mounted on the unit when it is desired to photograph opaque objects or the interiors of partially opaque objects. The light sources on the one hand transmit through a translucent sheet or panel and thereafter through the transparency to be photographed. On the other hand, light from such translucent panel is returned to the panel and to photographic subjects thereon, by the reflector accessory when such opaque subjects are to by photographed.

An object of this invention, therefore is to provide an improved photographic copier system.

Another primary object of this invention is to provide an accessory for a photographic copier system which brings a high degree of versatility and innovative capability to such system.

A further object of this invention is to provide a film transparency copy facility in a photographic copier system, with an added accessory thereto for adapting such facility for photographing opaque subjects.

Other objects and advantages of this invention will be in part apparent and in part pointed out hereinafter and in the accompanying drawings, in which.

Figure 1:
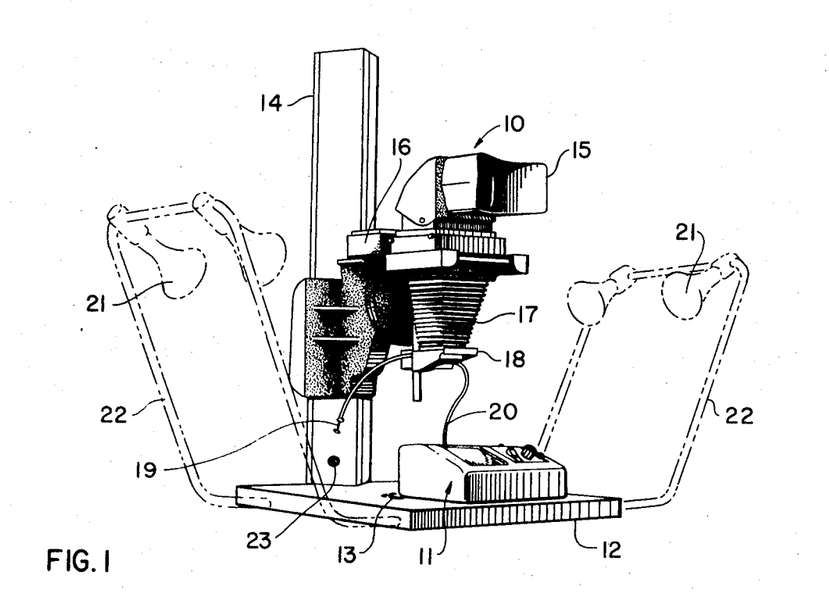
FIG. 1 is a perspective of a photographic copier system including the lighting source unit according to this invention in terms of its usage in such system.

The FIG. 1 structure comprises a downwardly facing photographic copier camera 10, and a light source accessory unit 11 according to this invention and for use in combination with the camera 10. The light source accessory unit 11 rests on a copier base platform 12 and is freely movable about on this platform, for suitable vertical alignment with the camera 10. Suitable markings, as indicated at 13, may be provided on the platform 12 to provide easy access to a standard, repeatable reference location for the light unit 11 on the platform. Variations of this position may be accomplished simply by moving the light unit about, for special purposes such as cropping.

An upright support member 14 is secured to the base platform 12, at the rear thereof, and the camera 10 is mounted on the support 14 for vertical adjustment thereon. The camera is provided with a viewer head 15 and a film pack back unit 16, movable horizontally together, to selectively use one or the other in alignment with the camera body 17. The lower end of the camera body 17 is provided with a standard form of lens and shutter unit 18 with suitable adjustments for speed and aperture variations. A shutter actuator button 19 is shown, and a connection 20 therefrom to the light unit 11 is provided in any suitable standard way for actuating the flash bulb in the light unit 11 in coincidence with the actuation of the lens and shutter unit 18.

The platform 12 and whatever photographic subject may be placed thereon in the absence of the lighting unit 11, are ordinarily illuminated by light sources 21 on side frame mountings 22 secured to the base platform 12. When the accessory light source unit 11 is used, the lights 21 ordinarily are not used, but they are available for extra or special supplementary lighting effects on subjects placed on the accessory unit 11. An electrical power input plug 23 is located in the upright support 14, and suitable electrical connections to the lights 21 and to supply connections for the accessory unit may be provided along or internally of the support 14 and the base 12.

Figure 2:
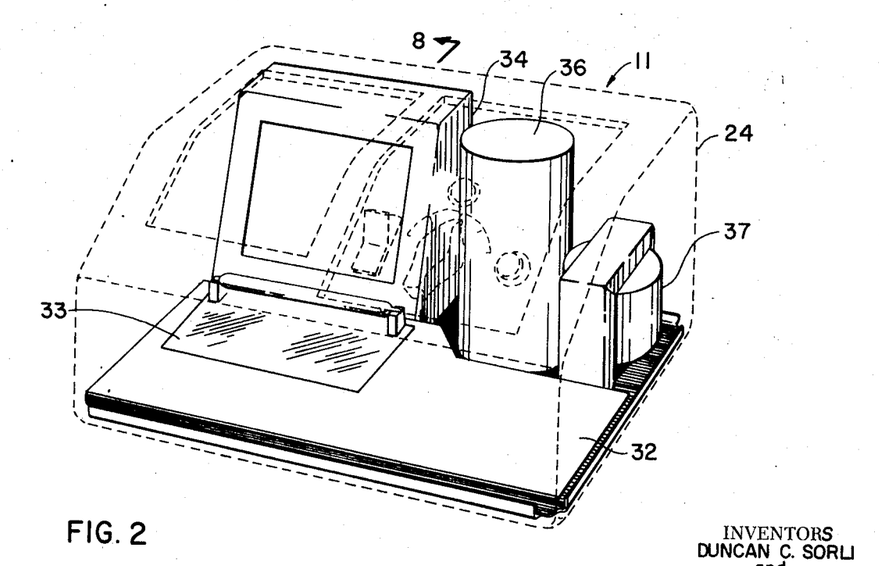
FIG. 2 is a perspective of the outer forms of the interior of a light source unit according to this invention.
Figure 3:
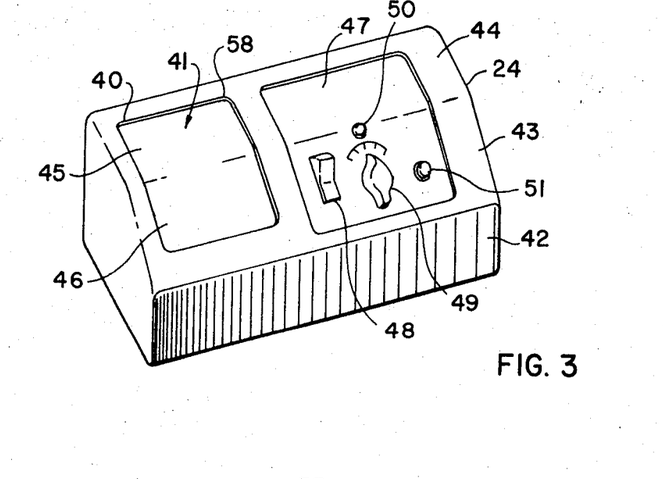
FIG. 3 is an external perspective of the unit of FIG. 2.
Figure 8:
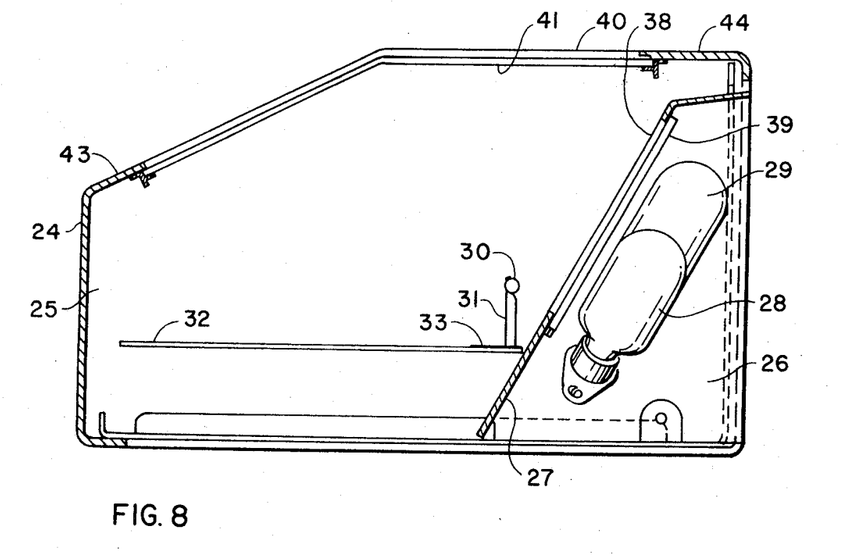
FIG. 8 is a transverse section on line 8 of FIG. 2.
Figure 9:
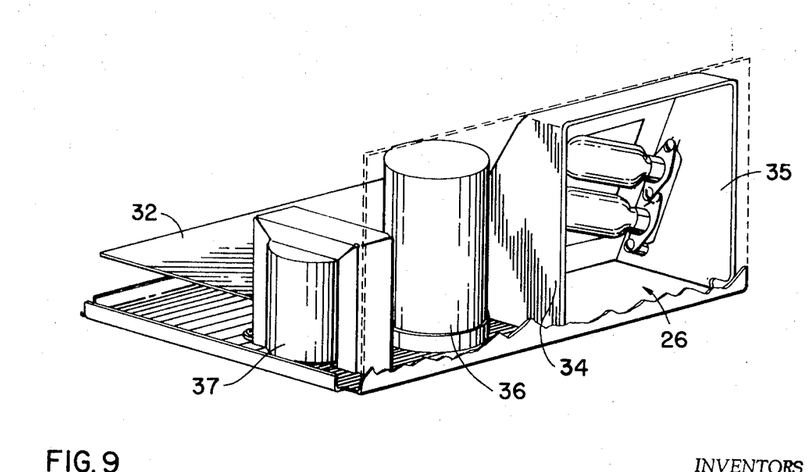
FIG. 9 is a perspective of the interior of the structure of FIG. 2, from the rear.

FIGS. 2, 8 and 9 illustrate the interior of the light source accessory unit 11, within a housing 24 shown in dotted lines in FIG. 2 and in exterior in FIG. 3. As in FIG. 8, the interior of the housing 24 is divided into a forward chamber 25 and a rear chamber 26 by a vertically disposed dividing wall 27 which slants upwardly and to the rear of the housing. The rear chamber 26 contains a pair of conventional projector-type 120 watt light bulbs or lamps 28 and 29. The forward chamber contains an elongated flash lamp 30 transversely mounted therein on vertical end uprights 31. Beneath the flash lamp 30 and forwardly horizontally disposed, is an electrical circuit board 32 for the various electrical systems and circuits used in this device. On the rear of the circuit board, and beneath the flash lamp 30, a reflector sheet 33 is provided to upwardly redirect downward light rays from the flash bulb 30.

As seen in FIGS. 3 and 9, the rear chamber 26 is limited to one side of the back of the overall interior, as defined by walls 34 and 35. The other side of the back of the overall interior of the housing 24 contains a flash bulb condenser 36 and a transformer 37, which are suitably connected in the flash bulb operating circuitry and the power supply to the light unit 11 from the power plug 23.

As in FIG. 8, the inner wall 27 is provided with an opening 38, covered by a heat shield 39. The heat shield may comprise any suitable dichroic material capable of transmitting visible light energy from the bulbs 28 and 29 while reflecting heat or infrared energy from these bulbs. Several such heat shields are on the open market, and one is selected to best suit the desired results for the device of this invention. Heat dissipation is facilitated in that the back of the rear chamber 26 is left open and a matching opening or a series of vent holes may be provided in the rear wall of the overall housing 24. The top of the overall housing 24 is provided with an opening 40, and a sheet of translucent material 41 covers this opening. This translucent material may be any suitably diffusive substance such as milk glass or opal glass. Thus light from the bulbs 28 and 29 is transmitted through the heat shield 39 to the translucency 41, and light from the flash bulb 30 is transmitted directly and by reflection to the translucency 41.

The outer form of the housing 24 is shown in FIG. 3. It is generally rectangular with the front and back in the long dimension. The front is a vertically narrow rectangular base 42 topped by a rearwardly slanting portion 43 terminating in a top flat rectangle 44 at the back of the housing and lengthwise of the housing. The slanting front and flat top each take up about half of the front to back dimension of the housing. The joining of the slant 43 and the top 44 is a clear angle between two flats, but is a softly curved joining.

Further in FIG. 3, the translucent sheet 41 is located in its housing opening 40, at the left side of the housing. The translucency 41 is a single sheet, bent transversely at the housing front and top joining to form a viewing and photographing flat and horizontal area 45 in the top of the housing, and a viewing and editing panel area 46 in the front slant of the housing 24. These two areas are essentially the same in form and dimension.

In the right hand portion of the housing 24 a recessed control panel 47 is mounted, also bent to the form of the housing, and with a set of controls in the front slant area. These controls comprise an on-off switch 48 for the overall electrical systems of the unit, a flash bulb condenser charge adjustment switch 49 with five stations representing five increments of condenser charge and consequent increments of flash bulb light intensity, and a ready light 50 which indicates when the condenser charge reaches the level to which it is directed by the switch 49. The on-off switch 48 activates the bottom lamp 28 in the rear of the housing for continuous illumination. A button 51 is provided for temporary actuation of the top lamp 29 in the rear of the housing, in additive supplement to the illumination by the bottom lamp 28.

This device provides three viewing capabilities. One is directly at an object to be photographed and located on the top area 45 of the translucent sheet 41. Another is at the same object in the same area and through the viewer 15 of the camera 10. The third is directly at objects such as transparencies located in the sant area 46 of the translucent sheet 41, for the purpose of general viewing, or in an editorial panel sense with transparencies side by side for comparison (See FIG. 4, Items 52 and 53). For instance, transparencies may be positioned on this slant area 46 of the translucent sheet 41 for more convenient viewing prior to being placed on its top area 45 for photographic operations. Most importantly, a transparency of a "standard" density may be positioned here for repetitive comparison with various other transparencies of differing densities to assist the operator in quickly and properly adjusting the camera shutter speed and aperture size in connection with the production of copies of such other transparencies.

This device provides four lighting capabilities, with various combination capabilities. One is the regular lamp 28 from the on-off switch 48. The second is the supplementary lamp 29 from the temporary operation switch 51. It will be recognized that this arrangement of the dual lamps 28 and 29 automatically provides sufficient illumination to facilitate the proper viewing of most objects whenever the unit 11 is turned on. Such illumination is of sufficiently low intensity as not to cause damage to the object itself. Also, when working with an object, such as a high density transparency, that requires higher intensity lighting to facilitate viewing operations, for instance in connection with camera focusing adjustments, the supplementary light 29 may be energized for periods of relatively short time duration so as not to damage the object. In both instances, the heat shield 39 also tends to preclude damage to the object.

The third lighting capability of the unit 11 is the flash bulb 30, operable from the button switch 19, FIG. 1, according to the level of intensity dictated by adjustment of the condenser charge increment switch 49. The fourth is the lamps 21, FIG. 1, for general use with the camera 10 without the accessory unit 11 and for additional illumination for the unit 11, if desired.

Figure 4:
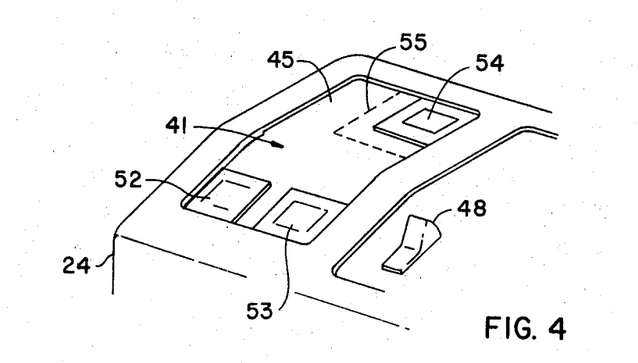
FIG. 4 is a face view of the translucent panel of a light source unit according to this invention, with illustrations of film transparencies thereon.
Figure 5:
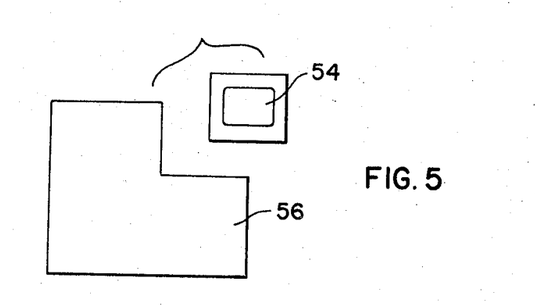
FIG. 5 is an exploded illustration of the combination of a film transparency and a masking sheet, for use on a translucent panel as in FIG. 4.
Figure 6:
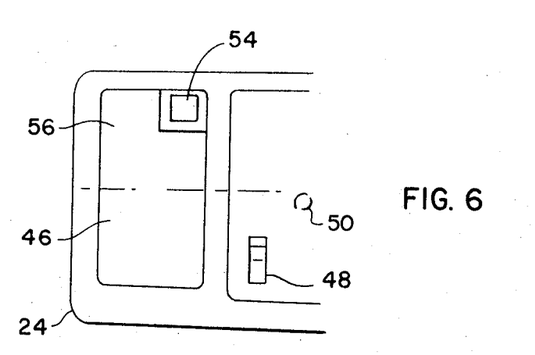
FIG. 6 is a view like that of FIG. 4, with the combination of FIG. 5 mounted thereon.
Figure 7:
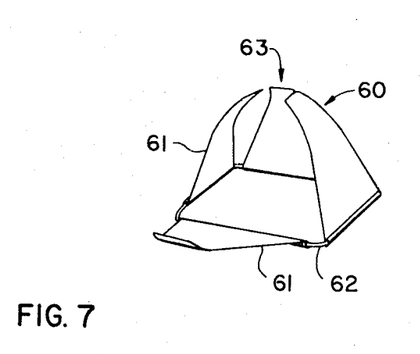
FIG. 7 is a perspective of a reflector unit accessory, for use on a translucent panel as in FIG. 4 for special lighting effects, particularly for opaque photographic subjects on the translucent panel.

FIGS. 4, 5 and 6 illustrate various forms of photographic capability. In FIG. 4, a 35 millimeter transparency 54 is shown as one size capability. Other sizes are indicated by the dotted line 55 and the overall three and a half inch by three and a half inch size of the photographing area 45 of the translucent sheet 41. When unwanted light or glare may appear around the edges of a transparency such as 54, a masking arrangement may be used. FIG. 5 shows the exploded view of the transparency 54 and an opaque or diffusive mask 56 to fill out the remainder of the translucent sheet photographic area 45. FIG. 6 shows this arrangement in operative position in the unit.

Figure 10:
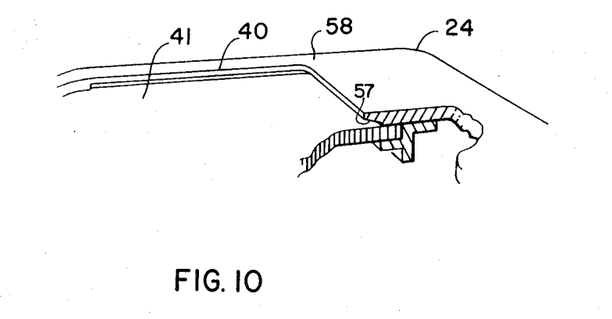
FIG. 10 is a fragmentary view of the translucent panel portion of FIG. 3, illustrating a corner undercut for reference location of film transparencies, for example.

FIG. 10 shows an undercut form 57 on two sides of the corner 58 of the housing opening 40. The edge of the holder of the transparency 54 may be located in this undercut as a repeatable reference point with respect to the lighting unit 11 in aid of its positional relation to the camera 10.

Figure 12:
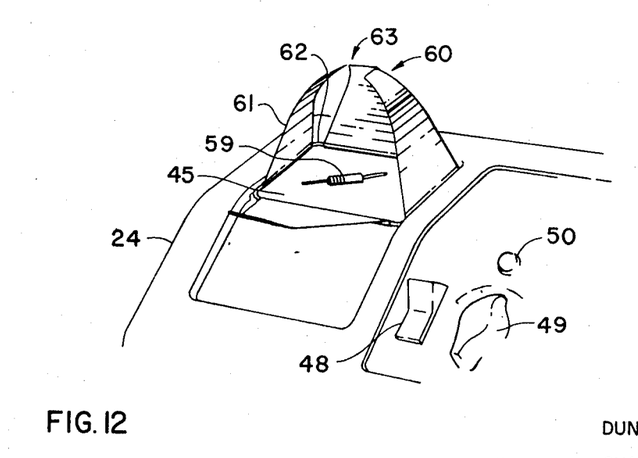
FIG. 12 is an assembly illustration of the reflector device of FIG. 7 as applied to a light source unit according to this invention, as exemplified in FIG. 3.

A further photographic capability of this device is in terms of opaque or partially opaque photographic subjects. FIG. 12, for example, shows an electrical component such as a resistor 59, positioned on the translucent sheet 41 to be photographed. A reflector unit 60 is positioned on the translucent sheet 41, over and about the resistor. Leaf-like or petal-like sides 61 of the reflector are crimp-mounted on each side of a square wire frame 62, for friction holding pivot adjustment thereabout. These reflector leafs, which may be formed of any suitable material such as aluminum having a relatively high light reflecting characteristic at least on its inner surfaces, may be individually adjusted to reflect light coming up through the translucent sheet area 45, back down to the resistor 59 in highly controllable lighting therefor. If the object to be photographed has something embedded in clear plastic for example, lighting of such an object is capable of tailor-made application by adjustment of the reflector leafs 61. These leafs are formed to provide a top opening 63 for alignment with the camera at all adjustment positions of the leafs, individually or in combinations within this effective range of their adjustments.

Figure 11:
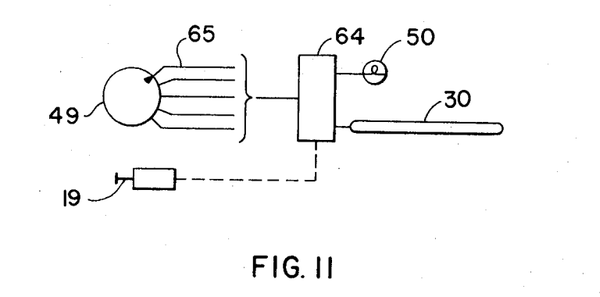
FIG. 11 is a schematic illustration of a flash bulb control and charge system according to this invention.

The lighting capability is extended in this device to a substantial degree of variation by the adjustment capability of the charge on the flash bulb condenser 36. FIG. 11 schematically presents this adjustment concept through the use of a suitable control circuit system 64, with increment adjustment controlled by the switch 49 through individual leads 65. The circuit capability actuates the ready light 50 when the proper charge level is reached, whether the charge increment is up or down. Such increments may be of the order of doubling the light intensity with each step, with a flash bulb operating between 90 and 340 volts, in a unique variety of substantial lighting changes over a highly useful broad range of intensity.

This invention, therefore, provided a high degree of photographic copier versatility. Various sizes of objects may be photographed, and various types in the sense of degrees of opacity, thickness, black and white, color, and for various purposes. Many combinations of lighting are provided, with photographic capability greatly increased by their combination with the capabilities of the camera in terms of shutter speed and aperture size variation. These factors are enhanced in overall usefulness by the provision in this device of translucent panel means having a distinct photographic area and an editing panel area for ancillary uses with respect to such photography. The simple reference locatability of the device and photographic subjects thereon is a further element of versatility, enhanced by the ready insertion and removal of this accessory in and from a standard copier system, and the simple adjustment movement of this accessory to different positions on a base plate in such a copier system, with the accessory's own weight sufficient to hold it in its adjusted place.

What is claimed is:

1. For use in a photographic copy system for photographing objects, including pictures such as may be embodied in film transparencies, wherein a camera is provided for photographing such an object when such object is in a particular area:

a photographic copy light source unit for receiving and supporting such object in said area to facilitate such photographing by said camera;
said light source unit comprising:

translucent means for recieving and supporting said object on one side of said translucent means; and light source means on the other side of said translucent means for transmitting light through said translucent means to illuminate said object;

said translucent means including two areas in two different planes, wherein one such area may be used to support such object in photographic registry with such camera and the other such area may be used to support such object out of such registry for purposes ancillary to such photographing of said object.

2. A photographic copy unit according to claim 1, wherein said translucent means comprises a single sheet of translucent material, bent to form said two planar areas.

3. A photographic copy unit according to claim 1, wherein said translucent means comprises a single sheet of translucent material, bent to form said two planar areas, and wherein one such area is essentially horizontally disposed for so supporting such an object in such photographic registry and the other such area is essentially vertically disposed for supporting such an object for such ancillary purposes.

4. A photographic copy unit according to claim 1, wherein said translucent means comprises a photographic panel and an editing panel in a plane at an angle to said photographic panel.

5. A photographic copy unit according to claim 1 wherein said translucent means comprises a single sheet of translucent material, bent to form said two planar areas, and wherein one such area is essentially horizontally disposed as a photographic panel, and the other such area is canted downwardly therefrom as an editing panel.

6. A photographic copy unit according to claim 1, as an accessory to such a camera, and comprising a rectangular box-like housing with length dimension front and back, with its back in full height and its front in partial height;

wherein the top of said unit is essentially horizontal in the back portion of the unit and bent to a downward slope in the front portion of the unit;

wherein said translucent means is mounted as a bent panel in said unit top; and wherein controls for said light source means are mounted in said unit top in panel form beside said translucent means.

7. A photographic copy unit according to claim 1, as an accessory to such a camera in the form of a box-like housing with a pair of panels side-by-side in the top of said housing;

wherein one of said panels comprises said translucent means, and the other of said panels comprises a control assemblage for said light source means.

8. A photographic copy unit according to claim 1, as an accessory to such a camera, in the form of a box-like housing with a panel of said translucent means in the top thereof;

said panel, in its joining to said housing top, being provided with a locating undercut corner for receiving a corner of such object.

9. A photographic copy system for photographing objects, including pictures such as may be embodied in film transparencies, said system comprising:

a camera for photographing such an object when such object is in a particular area, and a photographic copy light source unit for receiving and supporting such object in said area to facilitate such photographing by such camera;

said light source unit comprising:

translucent means for receiving and supporting said object on one side of said translucent means; and light source means on the other side of said translucent means for transmitting light through said translucent means to illuminate said object;

said translucent means including two areas in two different planes, wherein one such area may be used to support such object in photographic registry with said camera and the other such area may be used to support such object out of such registry for purposes ancillary to such photographing of said object.

10. A photograhic copy system for photographing objects, including pictures such as may be embodied in film transparencies, said system comprising:

a camera for photographing such an object when such object is in a particular area, and a photographic copy light source unit for receiving and supporting such object in said area to facilitate photographing by such camera;

said light source unit comprising:

translucent means for receiving and supporting said object on one side of said translucent means, said translucent means including two areas in two different planes, wherein one such area may be used to support such object in photographic registry with said camera and the other such area may be used to support such object out of registry for purposes ancillary to such photographing of such object;

light source means on the other side of said translucent means for transmitting light therethrough to illuminate such object; and light source means separate from said light source unit, said separate light source means mounted in adjoining relation to said camera and configured for illuminating said one side of said translucent means and such object when the latter is positioned thereon.

11. A light source unit according to claim 10, in the form of a light source body as a separate unit, movable with respect to such a camera, to provide the combination of such camera and said light source unit with cropping capability with respect to such subject to be photographed.

12. A photographic copy light source system comprising:

a light source unit;

a translucent panel in said unit;

light source means for transmitting light through said translucent panel to illuminate an object on said panel to be photographed;

and reflector means for reflecting light so transmitted back to the outer surface of said panel.

13. A light source system according to claim 12, wherein said reflector means is in the nature of inturned flower petal forms with a central opening left open through which an object on said panel may be photographed.

14. A light source system according to claim 12, wherein said reflector means comprises a reflector sheet extending from a broad base form, away from and overlying said panel and terminating in a narrow tip bent inwardly over said panel.

15. A light source system according to claim 12, wherein said reflector means comprises an open support frame mountable on said panel, and leaf-like reflector members each with one edge mounted on said support frame.

16. A light source system according to claim 12, wherein said reflector means comprises an open support frame mountable on said panel, and a series of leaf-like reflector members each with a base crimp-mounted on said support frame for friction hold adjustment about said support frame as a pivot.

17. For use in a photographic copy system for photographing objects, including film transparencies and opaque objects, wherein a camera is provided for photographing such an object when such object is in a particular area:
a photographic copy light source unit for receiving and supporting such object in said area to facilitate such photographing by said camera;
said light source unit comprising:
translucent means for receiving and supporting said object on one side of said translucent means;
light source means on the other side of said translucent means for transmitting light through said translucent means to illuminate said object;
said translucent means including two areas in two different planes, wherein one such area may be used to support such object in photographic registry with such camera and the other such area may be used to support such object out of such registry for purposes ancillary to such photographing of said object; and
a light reflector unit for use with said light source unit for photographing opaque objects, said reflector unit comprising:
an open frame for mounting on said one area of said translucent means on said one side thereof, and
leaf-like reflector members pivotally mounted on said frame for friction hold adjustment about said pivot mounting to variably reflect light from said light source means to said opaque object.

18. For use in a photographic copy system, a photographic copy light source unit comprising:
a housing having an opening through the top thereof;
a translucent sheet of light diffusing material in said top opening;
means for providing two chambers within said housing including a wall disposed in said housing so as to provide a first chamber substantially directly beneath said top opening and a second chamber separated from said top opening by said wall, said wall including an opening therein;
a light transmitting heat shield in said wall opening;
a pair of light source bulbs for selectively continuous illumination of said translucent sheet through said heat shield, said bulbs being located in said second chamber in which heat from said bulbs is contained by said heat shield;
a flash bulb in said first chamber for illumination of said translucent sheet; and
control means for selectively operating said light source bulbs and said flash bulb.

19. A light source unit according to claim 18, additionally comprising a reflector beneath said flash bulb to direct light from said flash bulb to said translucent sheet.

20. A photographic light source unit according to claim 18, wherein said control means includes a switch and electrical connection to one of said light source bulbs for selectively continuous operation of said one of said bulbs, and a push button switch and electrical connection to the other of said light source bulbs for temporary operation of said other of said bulbs.

21. A photographic light source unit according to claim 18, wherein said control means includes a switch and electrical connection to one of said light source bulbs for selectively continuous operation of said one of said bulbs, a push button switch and electrical connection to the other of said light source bulbs for temporary operation of said other of said bulbs, and an activator switch, a flash bulb condenser and charge circuit in connection to said flash bulb for operation thereof.

22. The unit of claim 21 wherein said wall includes a substantially planar portion inclined at an angle to said top of said housing so as to extend from beneath said top opening to beyond a rear edge thereof, said wall opening is disposed in said wall portion beneath said housing opening, and said bulbs are mounted directly behind said wall opening so as to directly illuminate said top opening.

23. A photographic light source unit according to claim 18, wherein said control means includes an activator switch, a flash bulb condenser and charge circuit, a flash bulb condenser charge adjustment unit, a ready light for indicating when said condenser is charged as directed by said adjustment unit, and connection to said flash bulb for operation thereof.

24. A photographic light source unit according to claim 18, wherein said control means includes an activator switch, a flash bulb condenser and charge circuit, a flash bulb condenser charge adjustment unit, a ready light for indicating when said condenser is charged as directed by said adjustment unit, and connection to said flash bulb for operation thereof;
said charge circuit providing means for both increasing and decreasing the charge on said condenser, according to direction accorded by operation of said adjustment unit.

25. A photographic light source unit according to claim 18, wherein said control means includes separate switch and electrical connections for individual operation of each of said light source bulbs and said flash bulb.

26. For use in a photographic copy system, a photographic copy light source unit comprising:
a translucent sheet of light diffusing material;
a first light bulb for continuously illuminating said translucent sheet;
a second light bulb for temporarily illuminating said translucent sheet in supplement to said illumination thereof by said first light bulb;
a flash bulb for illuminating said sheet; and
control means for selectively so operating said light bulbs and said flash bulb, said control means including a switch configured for substantially continuously operating said first bulb, a push button switch for temporarily operating said second bulb to supplement the illumination of said first bulb, and an activator switch configured for flashing said flash bulb.

27. For use with a camera in a photographic copy system, a photographic copy light source unit comprising:

a housing having an opening through the top thereof;

a translucent sheet of light diffusing material in said top opening;

a vertically disposed wall in said housing, providing two chambers within said housing and having an opening therethrough;

a light transmitting heat shield in said wall opening;

a pair of light source bulbs for selective continuous illumination of said translucent sheet through said heat shield, said bulbs being located in the one chamber in which heat from said bulbs is contained by said heat shield;

a flash bulb in the other of said chambers for illumination of said translucent sheet;

control means for selectively operating said light source bulbs and said flash bulb, wherein said control means for said flash bulb includes an activator switch, a flash bulb condenser and charge circuit, a flash bulb condenser charge adjustment unit, a ready light for indicating when said condenser is charged as directed by said adjustment unit, and connection to said flash bulb for operation thereof;

said charge circuit providing means for both increasing and decreasing the charge on said condenser, according to direction accorded by operation of said adjustment unit and to increments of charge on said condenser;

said translucent sheet being provided with an essentially horizontal photographing area and with a vertically disposed editing area.

28. A photographic copy light source unit according to claim 27, and additionally comprising a reflector unit placed on said photographing area of said translucent sheet for directing light from said sheet back toward said sheet as a means of providing illumination for an opaque photographic subject on said translucent sheet.

29. A photographic copy light source system comprising:

a housing including a translucent sheet for supporting on one side thereof a subject to be photographed;

a flash unit mounted within said housing on the opposite side of said translucent sheet from said one side thereof and in operative relationship thereto for selective illumination of said translucent sheet to facilitate photographic operations;

first means independent of said flash unit for illuminating said transparent sheet for purposes of viewing said subject prior to photographing the same; and second means configured for dividing said housing into a first chamber containing said sheet and said flash bulb and a second chamber containing said first means, said second means including a light transmitting heat shield for permitting a visible light energy from said first means to impinge upon said translucent sheet while precluding infrared energy from said first means from impinging upon said translucent sheet such that the heat produced by said first means is substantially retained in said second chamber.

30. The system of claim 29 wherein said second means includes a wall member slanted upwardly from beneath said sheet and to the rear of said housing so as to divide said housing into a forward chamber containing said flash unit and a rear chamber containing said first means, said wall member including an opening located beneath said sheet, and said second means including a light transmitting heat shield disposed across said opening.

31. The system of claim 29 wherein said translucent sheet includes a first area disposed in parallel relation to the base of said housing and configured for supporting an object for photographic copying and a second area slanted downwardly from said first area towards the front of said housing and configured for supporting an object for purposes ancillary to such photographic copying, said second means including a wall member slanted upwardly from beneath said sheet and to the rear of said housing so as to divide said housing into a forward chamber containing said flash unit and a rear chamber containing said first means, said wall member including an opening located beneath said sheet, and said second means including a light transmitting heat shield disposed across said opening, and said first means being located substantially directly behind said shield such that illumination from said first means is transmitted through said shield generally forwardly and upwardly so as to illuminate both said sheet areas.

32. The system of claim 31 wherein said first means includes a pair of light bulbs mounted within said rear chamber behind said light transmitting heat shield, and said unit additionally including control means comprising a switch and electrical connection to one of said light source bulbs for selectively continuous operation of said one of said bulbs, a push button switch and electrical connection to the other of said light source bulbs for temporary operation of said other of said bulbs, and an activator switch, a flash bulb condenser and charge circuit in connection to said flash bulb for operation thereof.

* * * * *